Dec. 7, 1965   J. T. GELARDI   3,221,566
POWER TRANSMISSION MECHANISM
Filed Feb. 19, 1962   10 Sheets-Sheet 1

INVENTOR.
JOSEPH T. GELARDI
BY Roy C. Hopgood
ATTORNEY

Dec. 7, 1965  J. T. GELARDI  3,221,566
POWER TRANSMISSION MECHANISM
Filed Feb. 19, 1962  10 Sheets-Sheet 2

Fig. 3a
DRIVEN

Fig. 3b
DRIVING

INVENTOR.
JOSEPH T. GELARDI
BY
Roy C. Hopgood
ATTORNEY

Dec. 7, 1965   J. T. GELARDI   3,221,566
POWER TRANSMISSION MECHANISM
Filed Feb. 19, 1962   10 Sheets-Sheet 3

Fig. 6a
DRIVEN

Fig. 6b
DRIVING

Fig. 7a
DRIVEN

Fig. 7b
DRIVING

*INVENTOR.*
JOSEPH T. GELARDI

BY
ATTORNEY

Dec. 7, 1965  J. T. GELARDI  3,221,566
POWER TRANSMISSION MECHANISM
Filed Feb. 19, 1962  10 Sheets-Sheet 4

INVENTOR.
JOSEPH T. GELARDI
BY
Roy C. Hopgood
ATTORNEY

Fig. 9

Dec. 7, 1965   J. T. GELARDI   3,221,566
POWER TRANSMISSION MECHANISM
Filed Feb. 19, 1962   10 Sheets-Sheet 6

INVENTOR.
JOSEPH T. GELARDI
BY
Roy C. Hopgood
ATTORNEY

Dec. 7, 1965  J. T. GELARDI  3,221,566
POWER TRANSMISSION MECHANISM
Filed Feb. 19, 1962  10 Sheets-Sheet 7

Fig. 12

INVENTOR.
JOSEPH T. GELARDI
BY Roy C. Hopgood
ATTORNEY

INVENTOR.
JOSEPH T. GELARDI

United States Patent Office 3,221,566
Patented Dec. 7, 1965

3,221,566
POWER TRANSMISSION MECHANISM
Joseph T. Gelardi, Yonkers, N.Y., assignor to American Technical Machinery Corp., Mount Vernon, N.Y., a corporation of New York
Filed Feb. 19, 1962, Ser. No. 174,161
22 Claims. (Cl. 74—68)

This invention relates to a power transmission mechanism and, more particularly, to a mechanism for coupling and decoupling a load from a power source.

In the past, much activity has been conducted towards providing a wide variety of power transmissions for alternatively engaging and disengaging loads from power sources. Most of these prior devices that have been developed, however, require frictional engagement between moving parts which produces wear, or such prior mechanisms have been of such undue complexity as to render them prohibitive as practical apparatus.

Accordingly, it is a principal object of the invention to provide a power transmission mechanism to couple and decouple a load with a power source.

It is also an object of the invention to provide a power transmission mechanism without frictionally engageable parts to couple a load with a power source.

A further object of the invention is to provide a power transmission mechanism having a minimum of component parts to achieve alternate engagement and disengagement between a load and a power source.

A still further object of the invetnion is to provide a power transmission to disengage a load completely from a power source and, when desired, to engage the load with the power source at a maximum operating efficiency.

Another object of the invention is to provide a power transmission mechanism to couple a load with a driver without slippage, but which will release automatically upon the development of a maximum, predetermined torque.

Still another object of the invention is to provide a power transmission mechanism in which a driver may rotate in a first direction and couple a load thereto and which will release automatically upon the development of a maximum predetermined torque, but in which the driver may be coupled to the load positively without release at predetermined torque when the direction of rotation of the driver is reversed.

Yet another object of the invention is to provide a power transmission mechanism for engagement or coupling only at a predetermined position rotationally and which cannot be coupled accidentally at other rotational positions.

Briefly, a power transmission mechanism in accordance with one form of the invention includes power input means for connection directly to a source of mechanical power and power output means for direct connection to a mechanical load. The power input and power output means are spaced a predetermined distance apart and adapted to be rotated about a common axis. Two levers pivotally supported between the power input and output means are positioned to engage each other at one end, one lever being attached at its opposite end with the power output means. The two levers are arranged so that they are movable into and out of clutching engagement.

To the above cited and other ends and with the foregoing and various other novel features and advantages and other objects of the invention as will become more readily apparent as the description proceeds, the invention consists in certain novel features of construction and in the combination and arrangement of parts as will be pointed out more particularly hereinafter in the claims annexed hereto and described and referred to more fully in connection with the accompanying drawings, wherein:

FIG. 13b is a force diagram corresponding with the arrangement of FIG. 13a.

General description

Figure 1:
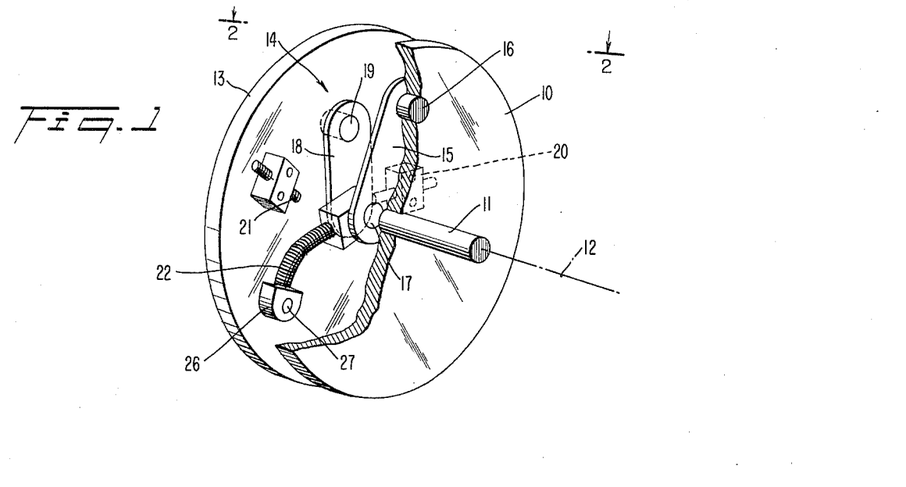
FIG. 1 is a diagrammatic perspective view, partly broken away showing the arrangement of the parts of my invention.
Figure 2:
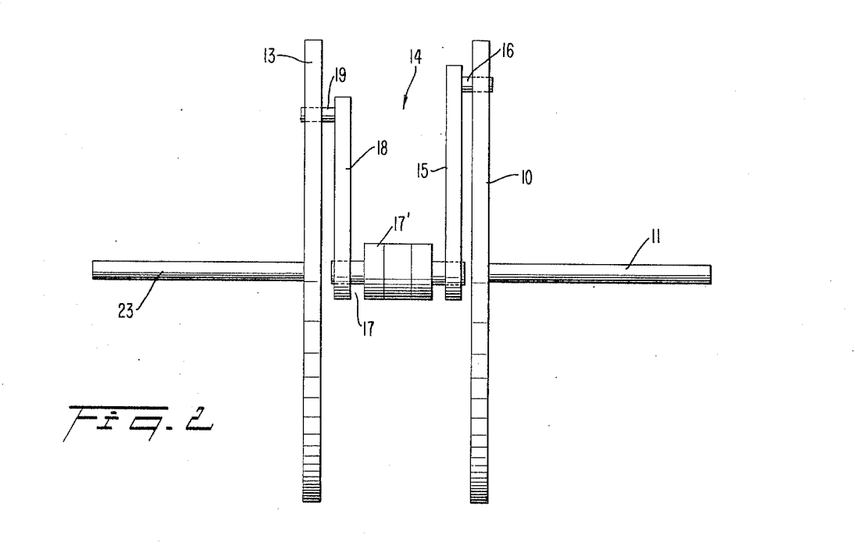
FIG. 2 is a side view of the power transmission mechanism of FIG. 1 along a vertical plane of the line 2—2 thereof.

Referring now to an illustrative form of the invention and, more particularly, to FIGS. 1 and 2 of the drawings, there is shown a front disc 10 fixedly mounted on a rotatable shaft 11 having an axis 12. Disc 10 may be considered as the driving disc as it may be coupled through shaft 11 to driving means not shown. The actual device for providing the rotation of shaft 11 may be a conventional power source such as a motor or other drive means incorporating belt, gears, or other means. A second disc 13 is axially mounted on a shaft 23 which may in turn be coupled to a device which is to be rotatably driven. Discs 10 and 13 are mounted in axial alignment although shafts 11 and 23 remain physically separated from one another except for the coupling linkage to be described herein.

As shown in FIG. 2, discs 10 and 13 are mounted in spaced-apart relationship and are coupled together by linkage means 14 comprising two levers or arms 15 and 18, preferably of different lengths. Lever 15 is connected to disc 10 by means of a pin 16 at its outer end. The connection between disc 10 and lever 15 allows both disc 10 and lever 15 to rotate one relative to the other about pin 16.

A similar arrangement exists with respect to lever 18 which is pivotally mounted at its radially outer end or region to disc 13 by means of pin 19. Pin connections 16 and 19 are substantially off-center from axis 12. Levers 15 and 18 are pivotally coupled together at their inner regions or ends by means of a pin 17. Therefore, it is possible for levers 15 and 18 to rotate one relative to the other about pin 17. A collar 17′ may surround pin 17 which may be used to receive a displacing force as described hereafter. The positions of the pins 16 and 19 are selected so that predetermined points on the inner regions of levers 15 and 18 which are connected to pin 17 are adapted to move into and out of axial alignment with the common axis 12.

A stop 20 may be provided against which the lever 18 may be urged when the levers are in the position shown in FIG. 1. Stop 20 is secured to the surface of the disc 13. Another stop 21 is supported also by the disc 13 in spaced relationship with the common axis 12 against which lever 18 may be urged when levers 15 and 18 are moved out of axial alignment with the common axis 12. If desired, stop 21 may be in the form of a threaded screw supported in a block, the position of which may be adjusted to control the position of levers 15 and 18 when such levers are out of alignment with the common axis 12. In order to provide a clutching action according to the principle of this invention, it is necessary to displace pin 17 from alignment with axis 12 and accordingly means are provided to apply a generally transverse force against pin 17. Spring means for applying such force are shown in FIG. 1, and such means comprise a biased spring 22 fixedly secured in a mounting 27 which in turn is attached to disc 13. The other end of spring 22 may comprise a head which may be coupled to and press against collar 17′. As shown in FIG. 1, spring 22 is under tension and constantly tends to pull collar 17′ and pin 17 from axial alignment.

Figure 3A:
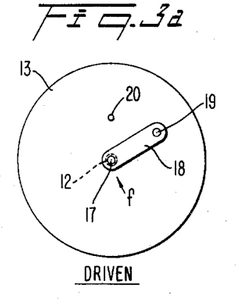
FIGS. 3a–g are a series of diagrammatic views illustrating the engagement and automatic release of the clutch mechanism for the driving element rotating in a first direction.
Figure 3B:
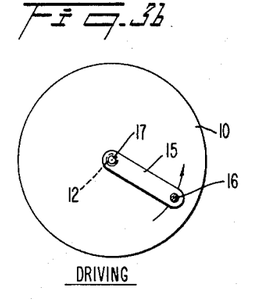
Figure 3C:
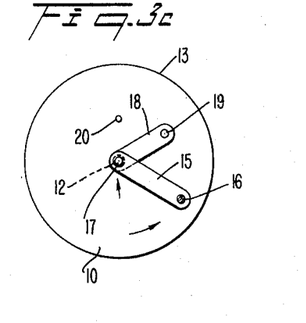

FIG. 3 is intended to illustrate the effect of the transverse force $f$ when the discs 10 and 13 are in the positions shown at FIG. 3a and 3b respectively. As shown in FIG. 3a, lever 18 and associated pin 19 are in a first position and at this time, a displacing force $f$ is applied intending to offset pin 17. Driving disc 10 is at the position shown in 3b and is being rotated in the counterclockwise direction. Lever 15 and its associated pin 16 are spaced somewhat behind the position of lever 18. At this time, the relative positions of levers 15 and 18 are shown more particularly at FIG. 3c. In order for force $f$ to move pin 17, it is necessary to move the entire linkage 14 comprising levers 15 and 18, which in the position shown in FIG. 3c, is a rigid triangle and pin 17 is not transversely movable. Accordingly discs 10 and 13 are not coupled together, and in this state the clutch is disengaged.

Figure 3D:
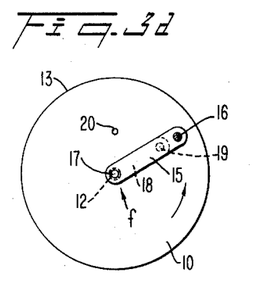

Referring now to FIG. 3d, disc 13 and lever 18 are in the same position as previously shown at FIG. 3a; however, lever 15 has moved counterclockwise a sufficient amount so that it is in the same radial or aligned position as lever 18. Levers 15 and 18 may be said to be in radial alignment when lines passing through pins 16 and 19 and axis 12 respectively form substantially a straight line.

Figure 3E:
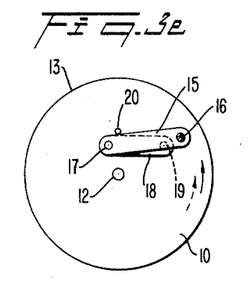

When the levers are in substantial radial alignment, a force $f$ is applied to pin 17, and the entire linkage comprising levers 15 and 18 may rotate about pins 16 and 19. Because levers 15 and 18 are of unequal length insofar as points 16 and 19 are at unequal distances from axis 12, a small angle $a$ is formed between the two levers. The angle $a$ is developed due to the difference in lengths between the levers 15 and 18, as well as due to a small amount of deforming between these levers and the pin 17. This rotation, in effect, offsets pin 17 as shown in FIG. 3e. The movement of pin 17 may be halted by means of stop 20 although stop 20 does not contribute to clutching action at this time. So long as pin 17 is offset from axis 12, the clutch is engaged. That is, discs 10 and 13 cannot rotate one relative to the other so long as the inside ends coupled together by means of pin 17 are offset from the axis 12. At the position shown in FIG. 3e, the clutch is engaged but it can become disengaged as the torque applied to disc 13 is increased providing the overload declutching effect.

Although these levers are shown in the clutched position in FIG. 2, there is no load applied to the driver disc. As load is applied, lever 15 remains advanced ahead of the lever 18 by the small angle $a$ as shown in FIG. 3f, the importance of which will now be described.

Overload action

Figure 3F:
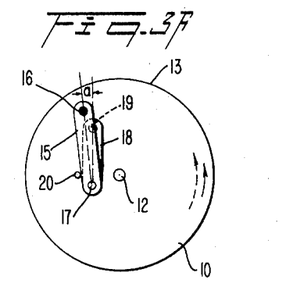
Figure 4:
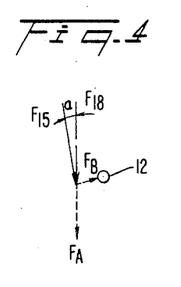
FIG. 4 is a force diagram for the position of the levers shown in FIG. 3(f).

A force diagram is shown in FIG. 4 to illustrate the reactions which are believed to be developed under the load condition of FIG. 3f. The force exerted by the driver lever 15 is designated by arrow $F_{15}$. This force is developed either because of increased load or torque on disc 13 or because of the centrifugal force produced as levers 15 and 18 rotate or both. This force $F_{15}$ is divided at the pin 17 into component forces $F_A$ and $F_B$. The force component $F_A$ acts along the longitudinal axis of the lever 18 tending to rotate disc 13; the force component $F_B$ acts on the lever 18 toward the common axis 12 tending to rotate the lever 18 about the pin 19 to move the pin 17 back into axial alignment with the common axis 12. The force component $F_B$ is relatively small since the angle $a$ is relatively small.

Figure 3G:
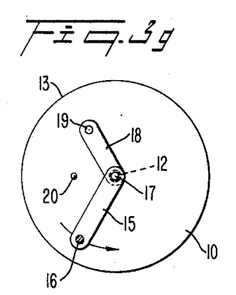

As the magnitude of the force $F_{15}$ increases with torque, the force component $F_B$ increases. When the force component $F_B$ is sufficient to overcome the bias action of spring 22, (FIG. 1) the pin 17 will snap back into axial alignment with the common axis 12, thus declutching the mechanism automatically. In its declutched condition, the lever 18 will remain stationary along with the driven disc 13, and the disc 10 together with the pin 16 will rotate about the common axis 12, as illustrated in FIG. 3g.

Figure 5:
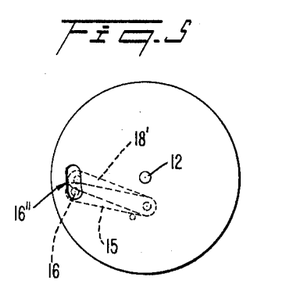
FIG. 5 is a diagrammatic view of an alternative embodiment having levers of approximately the same length.

Should the two levers 15 and 18 be equal in length, the pin 16 may be supported in a small slot in order to create the small angle $a$. Such a slot is illustrated by the numeral 16″ in FIG. 5 of the drawings, in which slot a pin 16′ may more easily move. A lever 18′ is shown in FIG. 5 to be substantially equal to lever 15.

Momentary clutch engagement

Figures 6A, 6B:
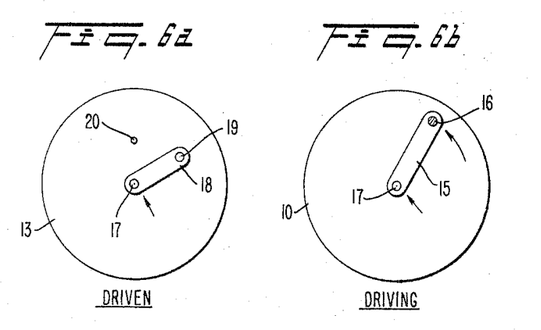
FIGS. 6a–e are a series of diagrammatic views illustrating the operation of the mechanism, the driving element rotating in the same direction as in FIG. 3.
Figure 6C:
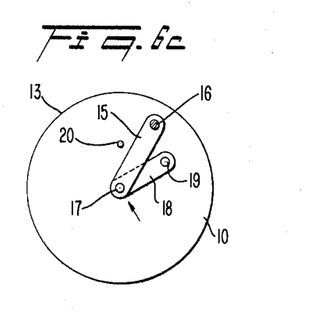
Figure 6D:
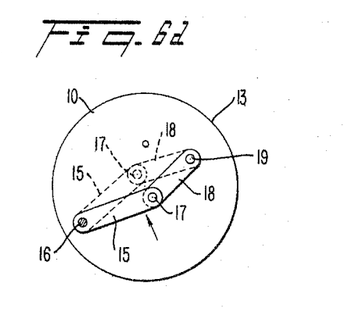
Figure 6E:
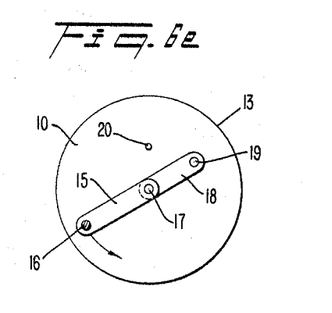

FIGS. 6a–e illustrate the effect of the displacing force $f$ being applied to pin 17 after lever 15 has passed lever 18. The positions of levers 15 and 18 are shown in FIGS. 6a and 6b respectively while FIG. 6c shows the relative position of levers 15 and 18. Lever 15 rotates counterclockwise until it is approximately 180° away from lever 18 as shown at FIG. 6d. At this time, force $f$ may displace pin 17 from the axis 12 as shown by dotted lines in FIG. 6d. However, this displacement is only momentary as the continued rotation of lever 15 carries pin 17 back into alignment shown in FIG. 6e.

Clockwise driving lever rotation

Figure 7A:
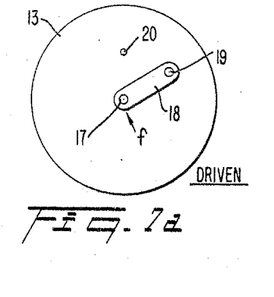
FIGS. 7a–f are a series of diagrammatic views similar to FIGS. 6a–e illustrating the operation of the mechanism with the driving element rotating in the reverse direction.
Figure 7B:
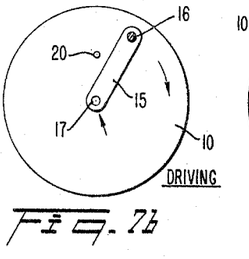
Figure 7C:
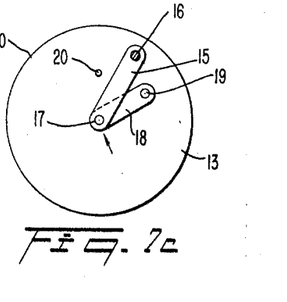
Figure 7D:
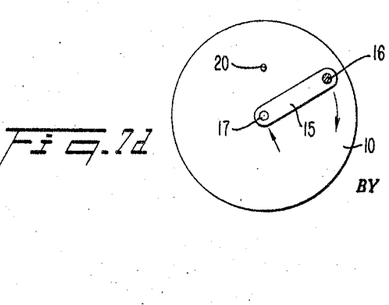
Figure 7F:
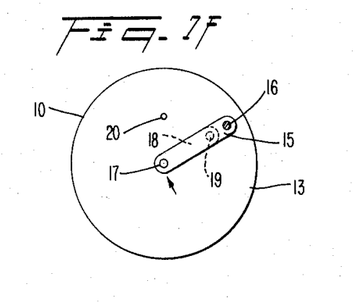
Figure 7G:
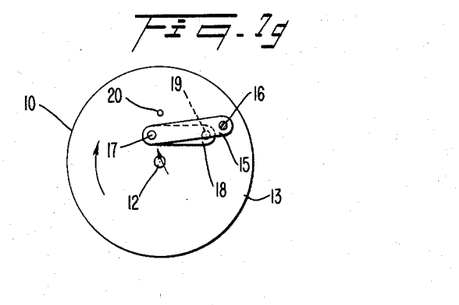

FIGS. 7a–f and 8a–e illustrate the operation of the clutch when the driving lever 15 is caused to rotate clockwise. FIGS. 7a and 7b illustrate the initial positions of levers 18 and 15 individually while FIG. 7c illustrates their relative position. As shown the driving lever 15 trails driven lever 18. When driving lever continues rotating to the position of FIG. 7d and the levers are radially aligned as shown in FIG. 7d a displacing force $f$ may move pin 17 out of alignment to rest against stop 20 causing clutch engagement.

Figure 8A:
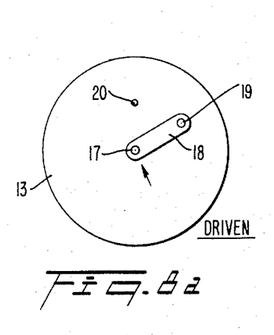
FIGS. 8a–e are a further series of diagrammatic views illustrating the operation of the power tranmission mechanism with the driving element rotating in the reverse direction.
Figure 8B:
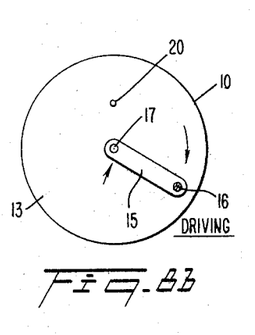
Figure 8C:
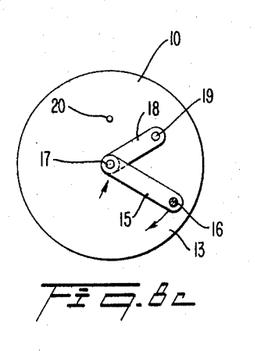

FIGS. 8a–8e are similar illustrations except that as shown in FIGS. 8a–c, the driving lever 15 leads driven lever 18.

Figure 8D:
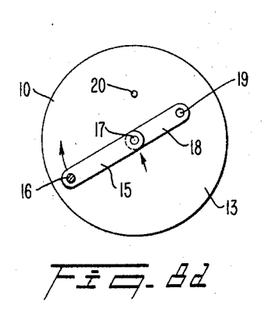
Figure 8E:
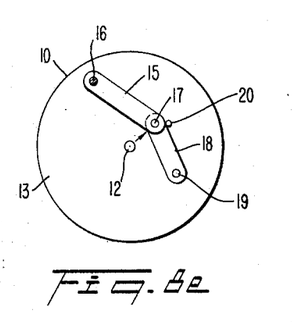

When lever 15 reaches the position shown in FIG. 8d, force $f$ displaces pin 17 to move lever 18 against stop 20 for true clutch engagement as shown in FIG. 8e. When the clutch is shown in the position at FIG. 8e, true positive engagement is effected which positive drive will hold regardless of the load imposed or the speed of operation. Centrifugal forces developed act to push lever 18 harder against stop 20. This necessarily provides a different clutch than the overrunning clutch previously described.

In summary, when the rotation of the driving clutch disc 10 is clockwise, a true clutching positive drive effect occurs by the movement of pin 17 because of the positioning of stop 20; while if the rotation of driving disc 10 is counterclockwise, overrunning clutch arrangement results which can be utilized in a manner to be described herein.

*Solenoid actuation*

Figure 9:
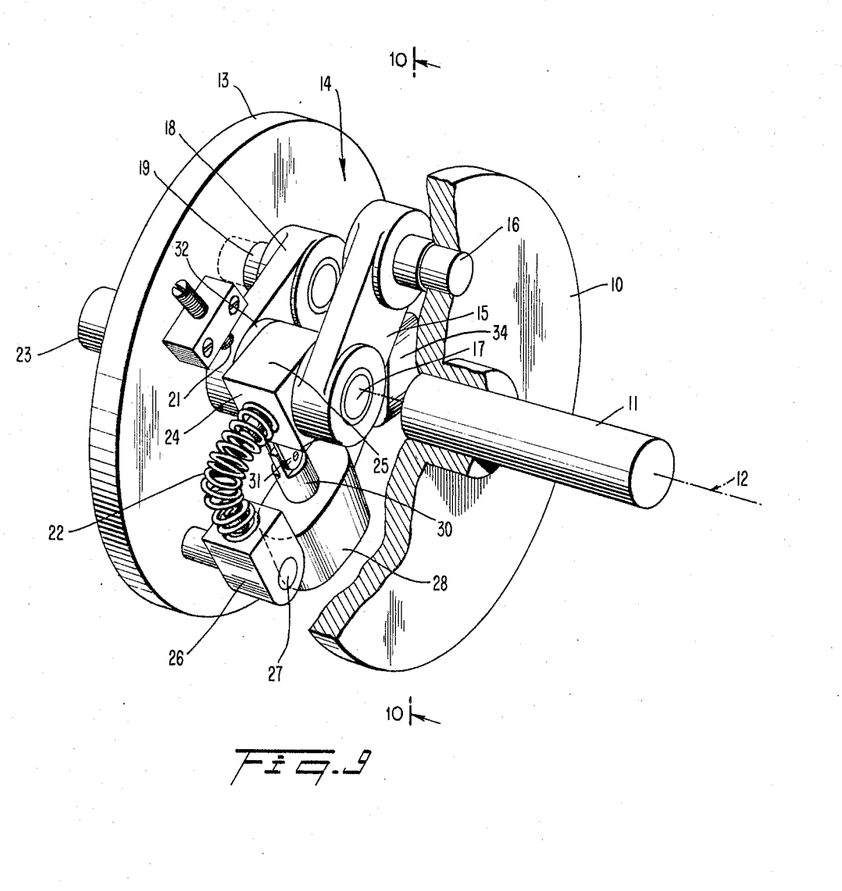
FIG. 9 is a perspective view of an arrangement similar to that shown in FIG. 1 of an embodiment of the invention and illustrating the power transmission mechanism in the engaged position.
Figure 10:
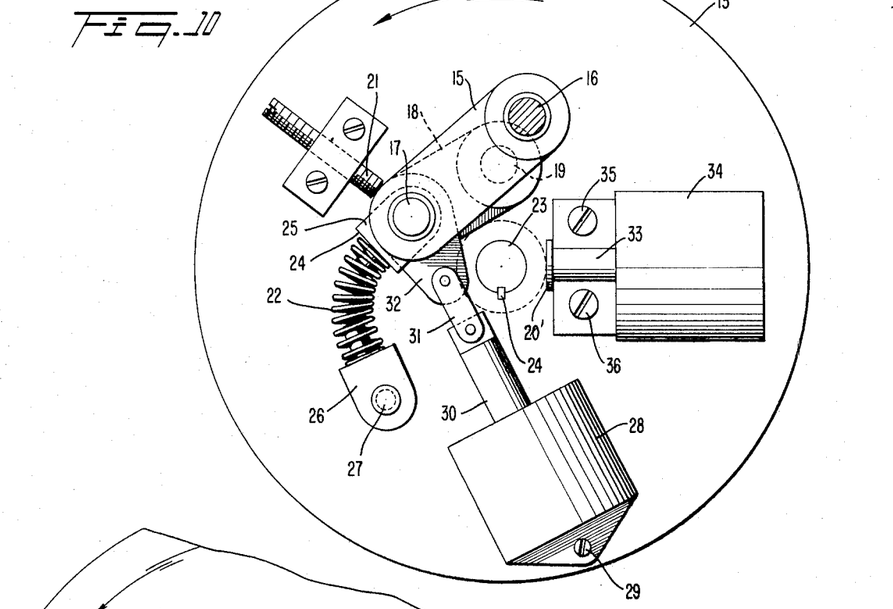
FIG. 10 is a front view of the arrangement of FIG. 9 along the vertical plane of the line 10—10 in FIG. 9.
Figure 11:
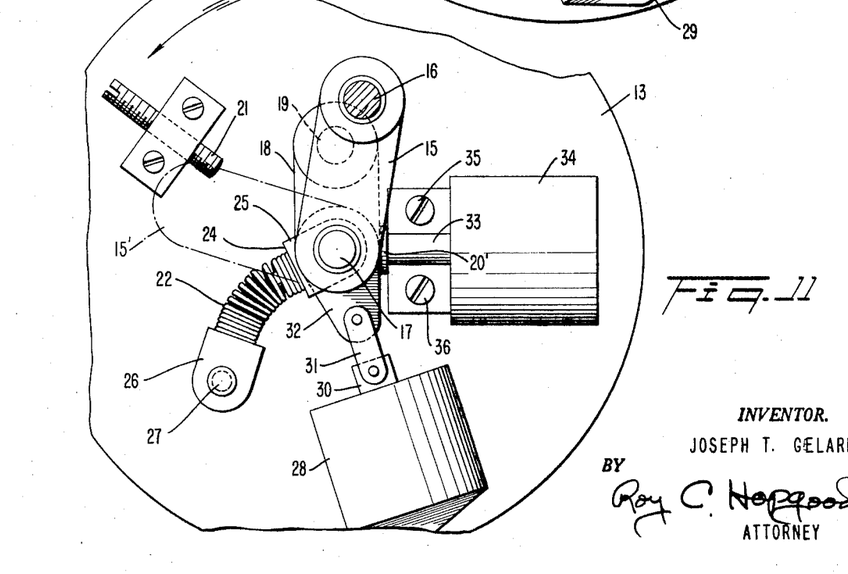
FIG. 11 is a view similar to FIG. 10 with the clutch in a disengaged position.

In the embodiments of FIGS. 9–11, solenoid and spring components are utilized to provide displacing and restoring forces. Levers 15 and 18 are positioned as previously described and are coupled together at their radially inner ends at pin 17. A spring 22 biased under tension is supported on disc 13 at one end in a mounting 26 having a pin 27 which secures the mounting and the spring.

A solenoid 34 having a plunger 33 and head 20' (which acts also as a stop) is shown mounted on disc 13 by screws 35 and 36. In its normal position, solenoid 34 is retracted. When it is expanded as by applying a short actuating signal, pin 17 is displaced and spring 22 carries pin 17 against a stop 21, the position of which is variable by applying rotation thereto.

In the positions shown in FIGS. 9 and 10 the clutch is engaged. Releasing the clutch may be provided by the overloading action previously described or by the use of an electrically operated solenoid 28 supported pivotally by a pin 29 (FIG. 10) on the disc 13. A plunger 30 operated by the solenoid 28 is attached by means of links 31 and 32 to pin 17. Thus, when the solenoid 28 is energized, plunger 30 pulls the pin 17 inwardly causing pin 17 to move into axial alignment with the shaft 23 and come to rest against a stop 20'. In this manner solenoid 28 acts as a means to produce clutch release and alignment of the inner ends of the levers.

It should be observed further that the mechanism of the invention is adaptable for clutch operation at only two positions of the levers 15 and 18, and only one of those positions is stable. A stable clutch engagement is accomplished only when the levers 15 and 18 are positioned relative to each other as shown in FIG. 3e of the drawings.

FIG. 11 illustrates the linkage of FIG. 9 when pin 17 has been moved into axial alignment with the common axis 12. The broken lines 15' in FIG. 11 illustrate the rotational movement of the lever 15 when the pin 17 is aligned with the common axis 12.

Since both of the solenoids 28 and 34 are operated electrically, it will be necessary to connect a source of electrical energy to each solenoid, and this may be accomplished in a variety of ways all within the purview of one skilled in the art.

It is understood that the relative positions of the solenoids 28 and 34 with respect to the other component parts is merely illustrative since it may be necessary to shift various elements in order to obtain rotational balance.

*Swinging lever type overload power transmission*

Figure 12:
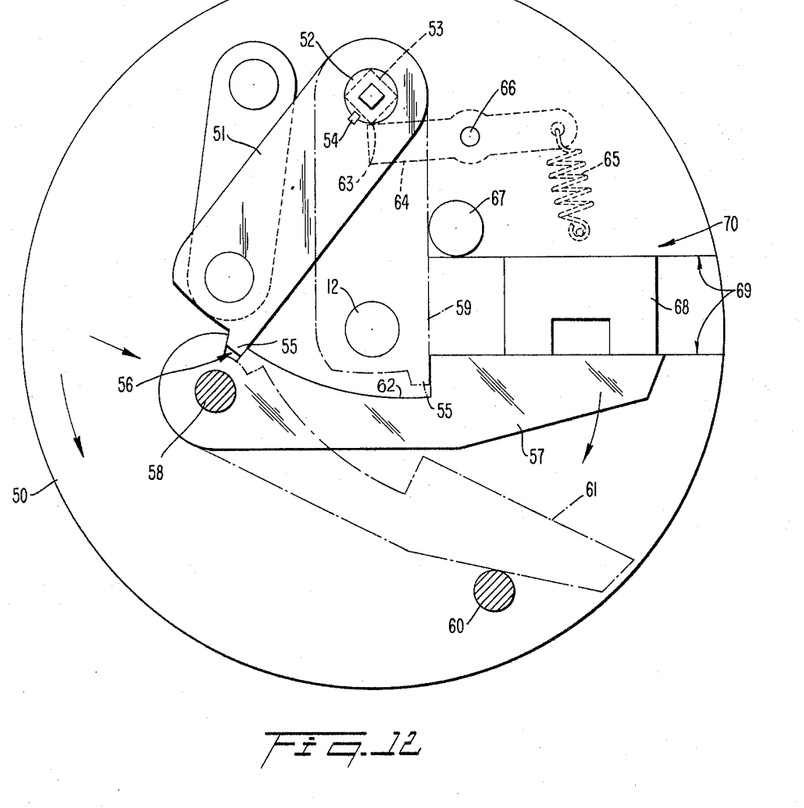
FIG. 12 is a schematic front view of an alternative embodiment of the novel power transmission.

Referring now to FIG. 12 of the drawings in which the principles of the invention are embodied in an arrangement uniquely adapted for use as an overload power transmission. Disc 50 will be considered for the purposes of this description as the driving source, the driven disc being removed to reveal the levers and associated components supported between the two discs.

A driving lever 51 is pivotally attached by means of a pin 52 to the driving disc 50. The pin 52 extends beyond disc 50 and is terminated in a square end, indicated by the dotted lines 53, the purpose of which will be described presently. The numeral 54 identified a key to attach the lever 51 fixedly to the pin 52.

At the opposite end of the lever 51 from the pin 52, an extension 55 is formed to be received in a slot 56 in a second lever 57. The second lever 57 is pivotally attached to the driven disc (not shown) by a pin 58.

Lever 51 is generally at rest in the center position as shown by the dotted lines 59. When the squared end 53 is rotated clockwise, the entire lever 51 will rotate clockwise so that extension 55 engages an edge of slot 56 rotating lever 57 counterclockwise to the horizontal position. A magnet 68 mounted on disc 50 offset from axis 12 applies a restraining force on lever 57 which force has a radial component to rotate lever 57 and to retain it in the clutched or horizontal position.

A recess 62 is formed in the lever 57 to prevent interference with the extension 55 as the extension 55 swings free of the slot 56. With the two levers 51 and 57 in the clutched position as indicated by the solid lines in FIG. 12, the extension 55 engages the slot 56 to transfer rotational driving power. However, upon the reaching of a predetermined maximum load condition, the lever 57 will rotate clockwise relative to lever 51 moving the extension 55 counterclockwise and permitting lever 51 to move to a neutral position as indicated by the dotted lines 59. In this neutral position, the extension 55 is completely out of engagement with the slot 56, and the lever 57 is rotated to a position against a stop pin 60 as indicated by the dotted line 61.

In the clutched position illustrated by the solid lines in FIG. 12, one edge 63 of the squared end 53 of pin 52 rests against a lever 64. A spring 65 attached to the opposite end of lever 64 from the edge 63 urges the lever 64 to rotate in a clockwise direction about a fulcrum 66. Thus, the lever 64 exerts an upward force against the squared end 53.

The driven lever 57 is also held in the clutched position indicated by the solid lines by the attraction of a magnet 68 acting against the lever 57 adjacent the opposite end from the pivot 58. Therefore, the strength of the holding torque due to the magnet 68 is dependent directly upon its distance from the pivot 58.

In accordance with the principles of the invention, the bias force tending to hold the lever 57 in a clutched position is adjustable by moving the magnet 68 to a predetermined position in a groove 69 of suitable construction. If desired, a scale may be marked on the surface of the disc 50 at a position, for example, indicated by the numeral 70 to calibrate the biasing force as related to the position of the magnet 68.

With the levers 51 and 57 in their respective declutched positions, as indicated by the dotted lines 59 and 61, respectively, the clutch mechanism is engaged by applying a suitable wrench to the squared end 53 of the pin 52 and turning to rotate the pin 52 clockwise. As the extension 55 engages an edge of the slot 56, the lever 57 will be rotated counterclockwise about the pivot 58 until it engages the magnet 68.

Assuming that the disc 50 rotates counterclockwise about an axis 12 common to both driver and driven discs, the pin 52 and lever 51 apply a force through the extension 55 wedged in the slot 56 to rotate pivot 58 along with its driven disc counterclockwise also about the common axis 12. Due to the configuration of the contact between the extension 55 and the sides of the slot 56, there is a small component of the driving force which tends to rotate the lever 57 in a clockwise direction about the pivot 58. However, the lever 57 is biased in the position shown by the solid lines due to the magnet 68.

As the magnitude of the driving force increases, the small declutching component of that force increases also, and when it reaches a predetermined value, the lever 57 will be moved away from the magnet 68 sufficient to cause declutching between the levers 51 and 57.

Magni lever embodiment

Figure 13A:
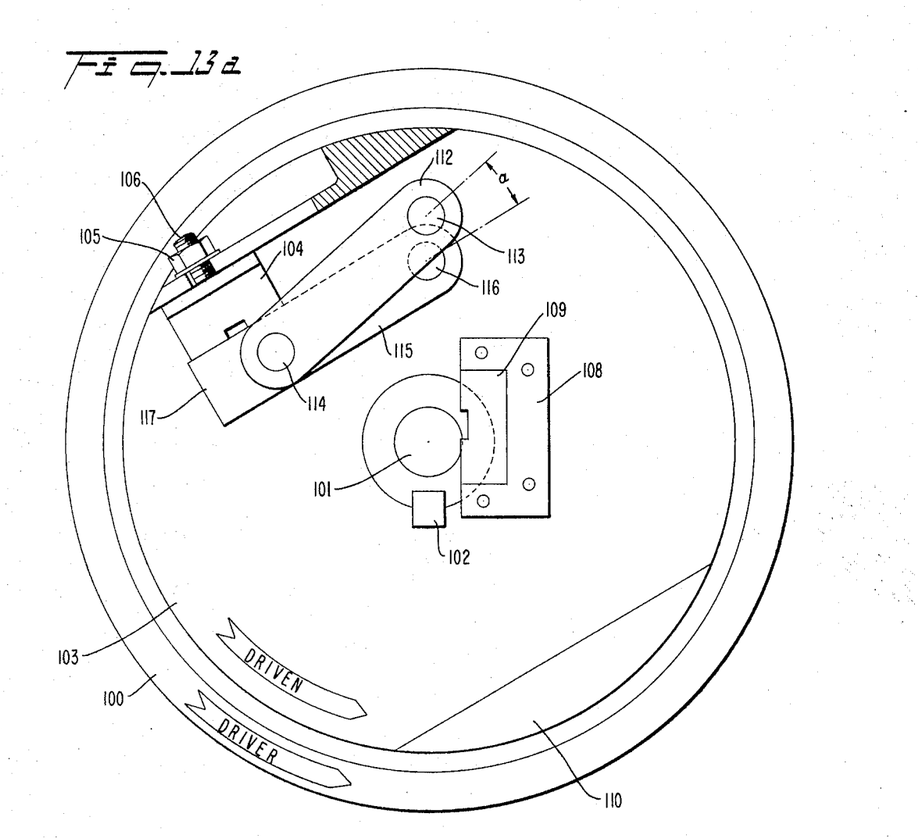
FIG. 13a is a schematic front view of another embodiment of the power transmission.

Referring to FIG. 13a, there is shown an overload clutch which operates on the principles heretofore described. A driving disc 100 is coupled to shaft 101 by means of shaft key 102. The driven disc 103 is coupled on a shaft not shown which is axially concentric with shaft 101. A magnetic block 104 is fixedly mounted on driven disc 103 in order to provide a force to displace the position of the driver lever 112 and driven lever 117. Magnetic block 104 has a longitudinal aperture therethrough to receive a screw 106. By adjustment of the position of screw 106 the radial position of magnetic block 104 can be adjusted.

A lever 112 is pivotally mounted on driving disc 100 at pin 113 while lever 115 is pivotally mounted on driving disc 103 at pin 112. Levers 115 and 116 are pivotally coupled together in a manner heretofore described at pin 114. Coupled to the end of lever 115 is an armature element 117 which may comprise materials such as iron or ferrite which are readily attracted by magnet 104. A stop 108 is fixedly mounted on driven disc 103 adjacent the center point of shaft 101 in order to fix the position of pin 114 when the transmission is disengaged. Stop 108 may also comprise a magnetic block 109 at the front thereof in order to coact with armature 117 when the transmission is disengaged. A counterweight 110 is mounted on driven disc 103 diametrically opposite the magnetic means.

When the transmission is disengaged, the pivot 114 is concentric with the axis of shaft 101 and has applied to it a force from magnet 109. The magnet 104 continuously exerts an attraction force against block 117 and when the levers 112 and 115 are in a position such that point 114 will rotate, the force from magnet 104 offsets pivot point 114 overcoming the force from magnet 109 to effect clutching.

Figure 13B:
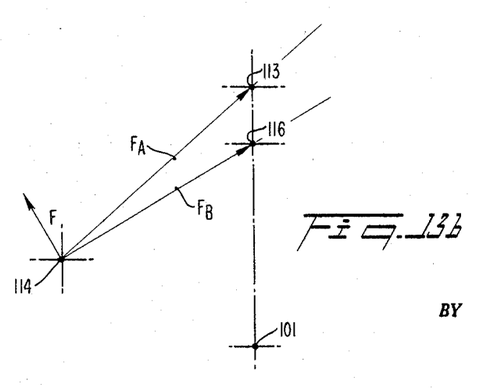

In order to understand the overload declutching effect, reference is made to FIG. 13b. When the entire assembly is rotating, forces continuously act on point 114 to keep it rotating relative to the center of shaft 101. Force F is applied by means of magnet 104. Additional centrifugal forces Fa and Fb are developed on driver lever 112 and driven lever 115 respectively. These forces are displaced one from another by a small angle a. When the centrifugal forces become sufficiently great such that the component of Fb along a line of action away from the direction of force F and toward the axis of shaft 101 pivot point 114 will rotate counterclockwise and become coincident with the center of shaft 101 at which time the clutch will become disengaged. The amount of force exerted by magnet 104 controls the speed or load at which declutching occurs. Movement of thread 106 and hence movement of magnet 104 will cause the declutching speed or load to vary. The action is similar to that described in connection with FIG. 3f and FIG. 4.

Inwardly swinging slotted lever

Figure 14:
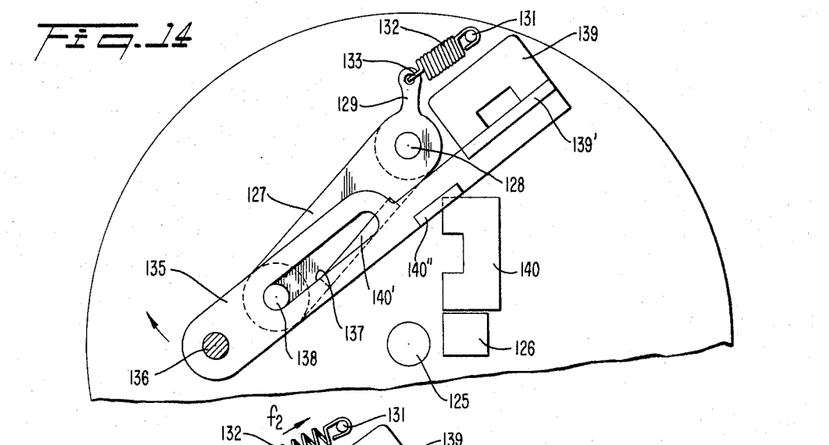
FIGS. 14–15 are diagrammatic views of still another embodiment of the power transmission mechanism of this invention.
Figure 15:
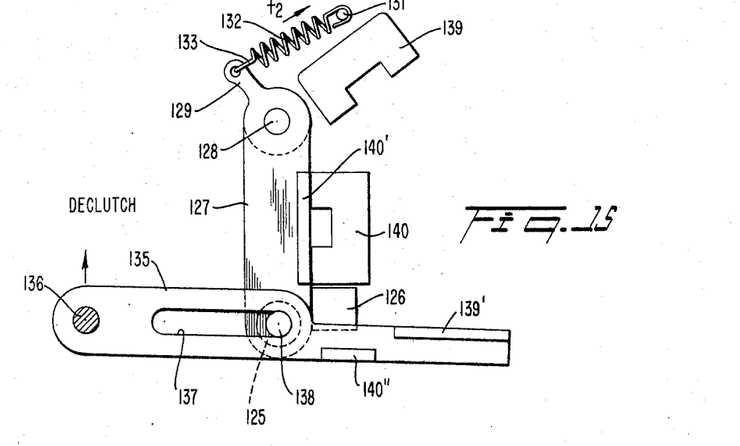
Figure 16:
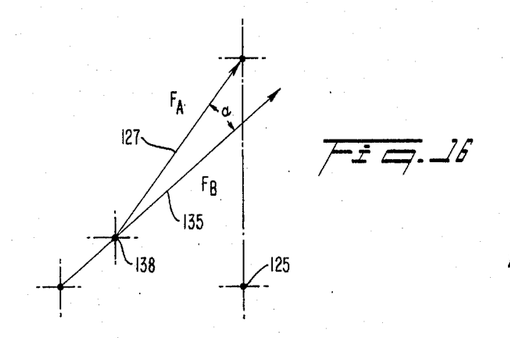
FIG. 16 is a force diagram corresponding with the arrangement of FIG. 15.

Referring now to FIGS. 14–16 there is shown an embodiment of the overload power transmission utilizing inwardly swinging levers. A driving disc (not shown) is pivotally connected to lever 135 at pin 136 and causes lever 135 to rotate clockwise. Driving lever 135 has a centrally located slot 137 which extends along the long dimension of lever 135. One end of slot 137 is positioned so as to coincide with centrally located pin 125 which is coaxial with the driving and driven discs. An extending arm of driving lever 135 may have magnetic elements 139' and 140' positioned on opposite sides thereof for reasons which will become apparent.

The driven lever 127 is mounted on a driven disc (not shown) by means of a pin 128. The other end of driven lever 127 comprises a pin 138 which is slidably movable in slot 137.

A magnetic block 139 mounted on the driven disc in off-centered relationship as shown, attracts the magnetic element 139' which as described previously is mounted on lever 135 at a position remote from pin 136.

Lever 127 has a projection 129 mounted thereon at its end adjacent pin 128. Projection 129 is coupled to one end of a resilient spring 132 which as shown in FIG. 15 is normally under tension tending to rotate lever 127 in a clockwise direction and thereby displacing pin 138. Actually, projection 129 acts as a lever since it also rotates about pin 128 to so urge lever 127 in a clockwise position. When the power transmission is engaged as shown in FIG. 14, spring 132 is released from tension.

A block 126 and a magnetic element 140 are positioned opposite the shaft 125 in order to provide a centering stop means. Lever 127 has a magnetic element 140' to coact with magnetic element 140.

When the power transmission is in the engaged position as shown in FIG. 14, pin 138 falls to the lowermost part of slot 137 whereas when the slot is disengaged pin 138 rises to one of the upper positions in slot 137 tending to rotate lever 135 clockwise while moving to the aligned position.

The operation of this power transmission is as follows. When in the disengaged position of FIG. 15, spring 129 acts to offset pin 138 by tending to rotate lever 127 clockwise. However, in the position shown, the pin 138 is immovable. When lever 127 continues its clockwise movement, the slot 137 also rotates and becomes aligned with the axis of lever 127. At this time, force F exerted by spring 129 causes the levers to rotate clockwise about pin 128 and assume the position shown in FIG. 14.

The disengagement of the power transmission and overload may be explained by referring to FIG. 16. Under ordinary circumstances, the forces $F_A$ and $F_B$ exerted on pin 138 are not sufficient to cause declutching. However, when the rotational speed increases such that a component of force $F_B$ directed toward center 125 is sufficiently great, pin 138 tends to move radially inwardly which movement causes lever 135 to rotate clockwise relative to 138 causing the levers to restore themselves to the position shown in FIG. 15.

Overload power transmission with slotted disc

Figure 17:
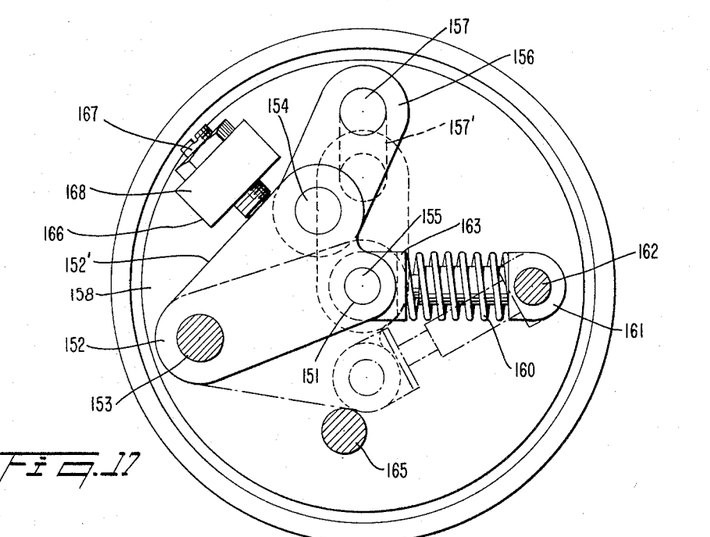
FIG. 17 is a diagrammatic view of another embodiment of the power transmission mechanism of the invention.

Referring now to FIG. 17 there is shown an embodiment of an overload power transmission featuring an inward swinging lever design. A central shaft 151 is pivotally secured to a driving disc having a driving lever 152 pivotally mounted thereto at pin 153. Driving lever 152 is of generally triangular shape with driving pin 153 being substantially at the apex thereof. Shaft 151 is rotatably coupled to lever 152 at pin 155 which is as shown at substantially the right vertex of the triangle. A driven disc having a driven lever 156 pivotally mounted thereon at pin 157 is provided and the other end of lever 157 is pivotally mounted at pin 154 to the left vertex of driving lever 152.

A spring 160 is fixedly secured by mounting means 161 to the driving disc at pin 162. The other end of spring 160 is formed into a mounting 163 which is also pivotally secured to pin 155. A stop 165 is provided on driving disc to limit the movement of mounting 163 when the power transmission is disengaged.

Also attached to driven disc 158 is a stop 166 comprising a block 168 having a radial aperture therein through which a threaded member 167 is secured. The position of threaded member 167 determines the angle of side 152' of lever 152.

In the position shown in FIG. 17 the clutch is engaged. Levers 152 and 156 are shown having a pivot point 154 displaced from center. Levers 152 and 156 as well as spring 160 are shown by dotted lines in the disengaged position.

Referring to driven lever 156 there is provided a radial slot 157' through which 157 may pass. This slot may be provided in the driven plate 158 or may actually be formed in driven lever 156. However, in the embodiment shown slot 157' is formed in the driven disc 158.

When the power transmission is disengaged pin 154 is positioned at the center of shaft 151 and spring 160 has been rotated counterclockwise to rest against stop 165 as shown by dotted lines. In this poistion the spring is under tension and exerts a force to urge the displacement of pin 154.

The power transmission becomes disengaged when the entire power transmission is rotating at a sufficiently high speed. The centrifugal forces exerted on pin 154 by levers 152 and 156 are such that the component of force provided by lever 152 causes pin 154 to move radially inwardly. The power transmission becomes disengaged and pin 154 moves to axially align itself with the center of shaft 151.

*Modified overload power transmission with inwardly swinging lever and slotted disc*

Figure 18:
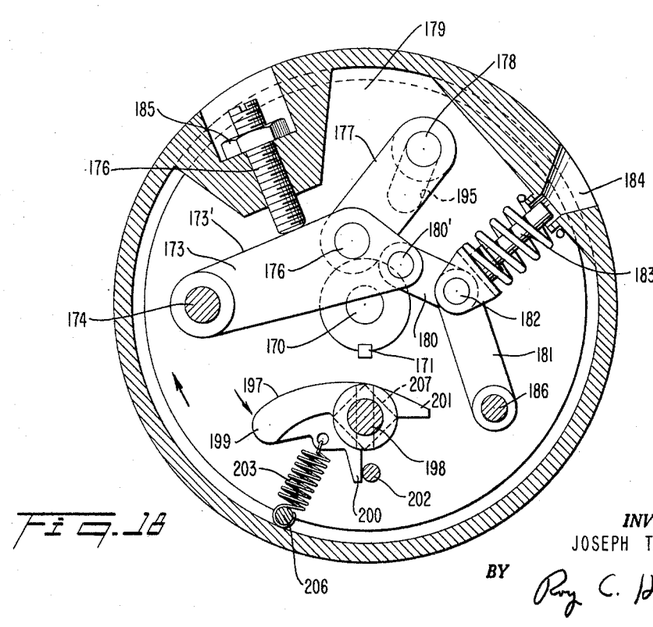
FIG. 18 is a diagrammatic view of still another embodiment of the power transmission mechanism of the invention.

Referring now to FIG. 18 there is shown an embodiment of the overload power transmission featuring an inwardly swinging lever with a slotted disc. A rotating shaft 170 is coupled to a driving disc by means of a key 171. A driving lever 173 is pivotally mounted on driving disc by means of pin 174. Lever 173 is generally of triangular configuration, the apex of which is pivotally mounted on pin 174. A driven disc 179 is provided with the driven lever 177 which is pivotally secured thereto at pin 178. The other end of driven lever 177 is pivotally mounted to driving lever 173 by pin 176 which is positioned substantially at one of the vertices of triangular driving lever 173.

Means to retain pin 176 in the aligned condition are provided by the spring 183 which is fixedly secured in driven disc 179 by means of a screw mounting 184. The other end of spring 183 is pivotally secured to a small lever 180 and a larger lever 181, the latter of which is fixedly mounted on driven disc 177 by means of a pin 186. The other end of lever 180 is pivotally connected to triangular shaped driving lever 173 at the remaining vertex by means of a pin 180'. Spring 183 is under tension tending to pull lever 180 which in turn acts to pull pin 176 toward the aligned state.

The driven lever 177 may move radially within driven disc 179 by means of a slot 195 which is radially formed therein. When pin 178 is in the lowermost position in slot 195, pin 176 is axially aligned and the clutch is disengaged.

A radially extending set screw 178 is positioned on driven disc 179 and secured thereto by means of a lock nut 185 and limits the movement of side 173' of lever 173.

The force provided by spring 183 is insufficient to cause initial displacement of pin 176 and there is provided a spring biased lever means 197 which may be manually turned to push against lever 173 and displace pin 176. This lever means comprises a curved head 199 which is pivotally mounted on driven disc 179 by means of a pin 198. Projections 200 and 201 project from the bottom of head 199 to come in contact with the stop 202 positioned therebetween and secured to driven disc 179. A spring 203 attached to a head 199 and a post 206 provides the resilient force for lever means 197. Concentrically mounted on pin 190 is a square block 207 which may be rotated by means of an external wrench to rotate lever head 199 and hence rotate lever 173 to offset point 176. This can occur when levers 177 and 17 are aligned as explained in conjunction with FIG. 8d.

When the speed of the engaged clutch is such that the centrifugal forces developed on pin 176 from levers 173 and 177 are sufficient to overcome the force against pin 176 provided by spring 183, in effect the radial component of the force exerted from lever 173 will urge pin 176 toward axis 170 in a manner which has been previously described. At this time pin 178 may move radially inwardly in the slot 195.

In summary, I have provided a power transmission formed of a driving disc secured to a driving shaft and a driven disc secured to a driven shaft. The shafts are disconnected from one another but have a common axis. The driving and driven discs are coupled together by means of a linkage comprising two rotatable levers each having a radially outer and a radially inner end. The outer ends of each disc are pivotally coupled to each of said driving and driven discs at points spaced from the axis. The inner ends of the levers are adapted to move between two different poistions. The first position is that of engagement in which the inner ends are fixedly coupled to each other at a point which is offset from the axis. At the second position, the levers are not fixedly coupled together and in general have their inner ends positioned substantially coincident with the axis. In the position in which the inner ends of the levers are not offset (when their inner ends are coaxial), the clutch is disengaged.

At this time, there are provided means to displace the inner ends from axial alignment. The means for displacing such inner ends may comprise a mechanical force provided by solenoids, magnets, springs, rotatable levers, blocks and wrench combinations, as well as by other elements which will occur to those skilled in the art. Such means provide a force to displace the inner ends from axial alignment so as to effect clutching. If desired, additional similar mechanical, electrical or electromechanical means may be provided to prevent displacing or apply a restoring force to control or vary the displacing and restoring of the inner ends from and to the common axis.

Further, while additional mechanical, electrical or electromechanical means such as those previously described may be provided to restore the displaced inner ends to axial alignment, the primary force developed in the overloading power transmission to provide restoration results from the normal operation of the power transmission such that at overload, the forces developed on the levers automatically act to effect disengagement. Under these circumstances, these additional mechanical, electrical or electromechanical means are utilized to adjust the force at which overload disengagement occurs. Further, various types of stop means may be utilized to limit the displacing of the various levers and to insure that they return to a position which is in axial alignment with the described shafts.

I claim:
1. A power transmission mechanism comprising
   power input means and power output means,
   said power input means and said power output means having a common axis of rotation,
   first and second normally independently movable lever means having radially outer and inner regions respectively, said inner regions being coaxial with said common axis when said first and second lever means are in a predetermined position, said first and second lever means being rotatable in substantially parallel planar paths,
   said lever means being pivotally attached to respective power input means and power output means at the outer regions thereof,
   and means coupling substantially the inner regions of said lever means when said inner regions are offset from the said common axis.
2. The power transmission mechanism of claim 1 including displacing means to displace said inner regions from said common axis.
3. The power transmission mechanism of claim 1 including means to displace said inner regions from said common axis and restoring means applying a force to return said inner regions into alignment with said common axis.

4. The power transmission of claim 1 in which one of said levers at its inner region has a longitudinal slot while the other of said levers at its inner region has a projection movable in said slot.

5. The power transmission of claim 1 in which one of said lever means has a longitudinal slot and said outer end of said other lever means is movable in said slot,
one end of said slot corresponding to the clutch position at the other end of said slot corresponding to the declutching device.

6. The power transmission mechanism of claim 1 in which said first and second lever means are of unequal lengths whereby said lever means form a small angle therebetween when offset from the said axis.

7. The power transmission mechanism of claim 1 in which one of of said lever means has a generally triangular shape, the apex of which forms said outer region and one of said other vertices form said inner region.

8. A power transmission mechanism comprising
power input means and power output means,
said power input means and said power output means having a common axis of rotation,
first and second separate lever means having radially outer and inner regions respectively,
said levers being pivotally attached to respective power input means and power output means at the outer regions thereof,
means to pivot said levers to and from two positions in substantially parallel paths,
at the first position, said inner regions being offset from said common axis and at the second position said inner regions having respective points thereof which are coaxial with said common axis,
and means pivotally coupling said inner regions of said levers,
said coupling means being movable to and from said first and second positions respectively.

9. A power transmission mechanism comprising
power input means and power output means,
said power input means and said power output means having a common axis of rotation,
first and second lever means pivotally attached to each other at a first selected point,
means to attach said first lever means to said input means at a second point offset from the common axis,
means to attach said second lever means to said power output means at a third point offset from said common axis,
expandable means coupled to one of said power input means and said power output means to displace said first and second lever means at said first point of attachment,
and stop means to limit the movement of said lever means at said first point.

10. The power transmission mechanism of claim 9 above in which said expandable means comprises a solenoid,
and spring means coupled to said solenoid means at said first point providing a force to move said first point toward axial alignment.

11. A power transmission mechanism comprising
power input means and power output means,
said power input means and said power output means having a common axis of rotation,
first and second levers having radically outer and inner regions respectively,
said first lever being secured at its outer region end to said power input means by pin means,
said pin means being coupled to a block having a predetemined configuration,
means to rotate said block and thereby pivot said first lever,
said first lever at its outer end having a projection,
said second lever being pivotally secured to said power output means and having a recess with walls thereof adapted to cooperate with said projection,
said projection being movable from a first position of axial alignment with said common axis to a second position of offset relationship,
said projection in its second position of offset relationship being secured to said second lever at said recess.

12. The power transmission mechanism of claim 2 in which said displacing means comprises a magnetic means adapted to be actuated and deactuated at predetermined times,
said magnetic means being mounted on said power input means or power output means.

13. The power transmission of claim 4 in which said displacing means displaces said projection and causes it to move in said slot.

14. A power transmission mechanism comprising power input means and power output means,
said power input means and said power output means having a common axis of rotation,
first and second lever means pivotally attached to each other at a first common pivot location coaxial with said axis,
means to attach said first lever means to said power input means at a second pivot location offset from the common axis,
means to attach said second lever means to said power output means at a third pivot location offset from said common axis,
said first and second lever means being rotatable in substantially parallel paths,
the lengths of said lever means being such that upon rotation of respective lever means about said second and third pivot locations, said lever means move said common pivot location out of axial alignment with said common axis.

15. A power transmission mechanism comprising rotational driver power input means,
means to support said driver power input means for rotation about a predetermined axis,
rotational driven power output means spaced from said driver power input means,
means to support said driven power output means for rotation about said predetermined axis,
at least two lever means pivotally coupled together at selected locations thereof,
an opposite location of one lever means being pivotally attached to said driver power input means and an opposite location of a second lever means being pivotally attached to said driven power output means so that the pivotal axis between said lever means is adapted to be positioned in axial alignment with said predetermined axis when said lever means are pivoted into a first position and said pivotal axis between said lever means being displaced out of axial alignment with said predetermined axis when said lever means are pivoted into a second position,
and means urging said lever means to remain in at least one of said first and second positions said lever means being displaced and movable in respective parallel paths.

16. A power transmission mechanism comprising power input means and power output means,
said power input means and said power output means having a common axis of rotation,
a first disc means secured to said power input means for rotation about said axis,
a second disc means secured to said power output means for rotation about said axis, both of said disc means being substantially parallel,
a first lever means pivotally attached to said first disc means at one end and the opposite end being adapted to be positioned into and out of axial alignment with said common axis,
a separate second lever means pivotally attached to said second disc means and adapted to be positioned in a first clutched position and a second declutched position, said first and second lever means being substantially parallel, means to engage said first and second lever means one to the other in said first clutched position so that power from said power input means is transmitted through said first and second lever means to said power output means, and means to bias said second lever means in said first clutched position until a driving force transmitted through said first and second lever means reaches a predetermined magnitude to override the bias means and permit said opposite end of said first lever means to be positioned in alignment with said common axis.

17. A power transmission mechanism comprising power input means and power output means, said power input means and said power output means having a common axis of rotation, a first lever means pivotally attached to said power input means at one end and the opposite end being adapted to be positioned into and out of axial alignment with said common axis, a second lever means pivotally attached to said power output means and adapted to be poistioned in a first clutched position and a second declutched position, said first position being a position out of axial alignment with said common axis, said first and second lever means being relatively movable with respect to each other except in the clutched position, and means to engage said first and second lever means one to the other in said first clutched position so that power from said power input means is transmitted through said first and second lever means to said power output means.

18. A power transmission mechanism as set forth in claim 16 including a second bias means to urge said first lever means to remain positioned with said opposite end in alignment with said common axis when said end is so aligned.

19. A power transmission mechanism comprising power input means and power output means, said power input means and said power output means having a common axis of rotation, first and second normally independently and rotatably movable lever means, said first and second lever means being rotatable in substantially parallel paths, said lever means being pivotally attached to respective power input means and power output means at the outer regions thereof, and means coupling selected regions of said lever means when said such regions are offset from the said common axis to provide clutching action said selected regions being coaxial with said common axis in a predetermined position of each of said levers, said levers being offset from said predetermined position during clutching, said levers being movable and pivotable in substantially parallel paths.

20. A power transmission mechanism comprising power input means and power output means, said power input means and said power output means having a common axis of rotation, first and second lever means of unequal lengths, means to attach said first lever means to said power input means at a selected location offset from the common axis, means to attach said second lever means to said power output means at a second selected location offset from said common axis, each of said lever means being independently movable in respective substantially parallel paths, and means coupling said lever means at selected locations thereof so that clutching occurs when said selected locations are out of axial alignment with said common axis.

21. A power transmission mechanism comprising power input means and power output means, said power input means and said power output means having a common axis of rotation, a first lever means pivotally attached to said power input means at one end and the opposite selected end being adapted to be positioned into and out of axial alignment with said common axis, a second lever means pivotally attached to said power output means and adapted to be positioned in a first clutched position and a second declutched position, said first position being a position out of axial alignment with said common axis, said first and second lever means being relatively movable except in the clutched position, and means to engage said first and second lever means one to the other in said first clutched position so that power from said power input means is transmitted through said first and second lever means to said power output means, means to apply a displacing force to said lever means to move said opposite end out of alignment, stop means to limit the degree of misalignment said lever means being movable and pivotable in substantially planar paths.

22. The power transmission as set forth in claim 14 including adjustable stop means to limit the movement of said lever means.

References Cited by the Examiner
UNITED STATES PATENTS

| | | | |
|---|---|---|---|
| 1,522,622 | 1/1925 | Glasgow | 192—30 |
| 1,865,839 | 7/1932 | Craig | 74—63 |
| 2,248,444 | 7/1941 | Torok | 74—68 |
| 2,492,071 | 12/1949 | Svensson | 74—63 |
| 2,893,527 | 7/1959 | Kalafsky | 192—56 |

FOREIGN PATENTS

| | | |
|---|---|---|
| 450,395 | 7/1949 | Italy. |

DAVID J. WILLIAMOWSKY, *Primary Examiner.*